United States Patent [19]

Taguchi

[11] Patent Number: 5,395,573
[45] Date of Patent: Mar. 7, 1995

[54] METHOD OF CARRYING PREFORM OF FRICTIONAL MATERIAL AND APPARATUS THEREFOR

[75] Inventor: Kazuhide Taguchi, Saitama, Japan

[73] Assignee: Akebono Brake Industry Co., Ltd., Tokyo, Japan

[21] Appl. No.: 94,221

[22] Filed: Jul. 21, 1993

[30] Foreign Application Priority Data

Jul. 29, 1992 [JP] Japan .................. 4-220968

[51] Int. Cl.⁶ ............................................. B29C 43/00
[52] U.S. Cl. ................................... 264/120; 264/112; 264/119; 425/112; 425/121; 425/126.1; 425/261; 425/397; 425/412
[58] Field of Search .............. 264/119, 112, 120; 425/112, 121, 126.1, 261, 397, 412

[56] References Cited

U.S. PATENT DOCUMENTS

| | | | |
|---|---|---|---|
| 4,900,240 | 2/1990 | Leinweber | 264/120 |
| 5,061,171 | 10/1991 | Akatsu | 425/356 |
| 5,085,570 | 2/1992 | Leinweber | 425/412 |

FOREIGN PATENT DOCUMENTS 0310594 9/1988 European Pat. Off. .
862444 12/1940 France .
WO-A-
8802685 4/1988 WIPO .

OTHER PUBLICATIONS

European Search Report, dated Nov. 5, 1993.

*Primary Examiner*—Mary Lynn Theisen
*Attorney, Agent, or Firm*—Finnegan, Henderson, Farabow, Garrett & Dunner

[57] ABSTRACT

A method of carrying preforms of frictional material, in which a preform 2 of a frictional material is carried so as to be put into a heat middle mold 8b of a heat mold 8 after the frictional material is preformed with a preforming mold 1, the preforming upper mold 1a is moved down so that the preform 2 held in a preforming middle mold 1b is pushed from above into a through storage hole 4a of a carrier 4, and the heat upper mold 8a is moved down after this carrier 4 is carried to above the heat middle mold 8b so that the preform 2 is pushed into the heat middle mold 8b from the lower portion of the storage hole 4a of the carrier 4.

2 Claims, 4 Drawing Sheets

METHOD OF CARRYING PREFORM OF FRICTIONAL MATERIAL AND APPARATUS THEREFOR

BACKGROUND OF THE INVENTION

1. Field of the Invention

The present invention relates to a method of carrying a preform of a frictional material for a brake, and an apparatus therefor.

RELATED ART

Conventionally such a frictional material is manufactured by heat forming after preforming. The preforming is a process of throwing a frictional material into a preforming middle mold combined with a preforming lower mold, and pressing this material by an upper mold to obtain a preform of a predetermined shape, and the heat forming is a process of throwing the preform into a heat press device to obtain a product by heating and pressing under the integrated state of a heat upper mold and a heat lower mold combined with each other after the preform is transferred into a heat middle mold of a heat mold.

However, in such a process of manufacturing a preform of a frictional material for a brake, the working of transfer of a preform into a heat middle mold of a heat mold has been performed by hand though the preform has been thrust and issued from a preforming middle mold automatically. Therefore, the working of transfer of the preform into the heat middle mold has not been effective, and dusts has been apt to be produced since an operator's hands directly touch the preform into which a bonding agent, a frictional performance adjusting agent, and so on are mixed, so that the environment of working has been deteriorated. In addition, since it is necessary to produce a preform hard enough not to be broken even if human hands touch it, it is not possible to produce a soft preform, so that from the view of this point the improvement of the quality of the frictional material has been restricted.

SUMMARY OF THE INVENTION

The present invention has been attained in view of the forgoing problems in the prior art, and the configuration of the method of carrying a preform of a frictional material in which after being preformed with a preforming mold having a preforming upper mold, a preforming middle mold and a preforming lower mold, a preform of a frictional material is carried so as to be put into a heat middle mold of a heat mold having a heat upper mold, the heat middle mold and a heat lower mold, is characterized in that the preforming upper mold is moved down so that the preform held in the preforming middle mold is pushed from above into a through storage hole of a carrier, and after the carrier is carried to a portion above the heat middle mold, the heat upper mold is moved down so that the preform is pushed into the heat middle mold from the lower portion of the through storage hole of the carrier. The configuration of the apparatus for carrying a preform of a frictional material is characterized by comprising: a preforming mold having a preforming upper mold, a preforming middle mold and a preforming lower mold; a preforming press device being provided with the preforming mold and having a main cylinder for up/down driving the preforming upper mold and an up/down driving device for up/down driving the preforming middle mold, thereby preforming a frictional material to obtain a preform; a carrier having a through storage hole the size of which is large enough to hold the preform so that the preform held in the preforming middle mold is pushed from above into the through storage hole by means of the preforming upper mold; a mold separating press device being provided with a heat upper mold and a heat middle mold of a heat mold which has the heat upper mold, the heat middle mold and a heat lower mold, and having a main cylinder for up/down driving the heat upper mold; and a moving device for reciprocating the carrier between below the preforming middle mold and above the heat middle mold whereby the heat upper mold is moved down by the main cylinder of the mold separating press device to push the preform into the heat middle mold from the lower portion of the storage hole of the carrier.

First, the heat mold taken out from the heat press device is separated into the heat upper model, the heat middle mold and the heat lower mold, the heat upper and middle molds are inserted into the mold separating press device, and a product is discharged from the heat middle mold by means of the heat upper mold.

In that time, in the preforming press device, a frictional material in the mold surface of the preforming middle mold is preformed into a predetermined shape in cooperation of the preforming upper, middle and lower molds with each other to thereby obtain a preform. The preform is carried to the carrier. That is, the preforming upper mold is moved up by the main cylinder of the preforming press device, and the preforming middle mold is moved up by the up/down driving device at the same time, so that a predetermined space is formed above the preforming lower mold. At that time, the preform is held in the preforming middle mold by frictional force. Next, the carrier is inserted into this space by the moving device. The preforming upper mold is moved down by the main cylinder of the preforming press device, so that the preform held in the preforming middle mold is pushed into the storage hole of the carrier. The preform made comparatively soft by preforming is held in the intermediate portion of the storage hole by frictional force.

If the preform is held in the storage hole of the carrier, the preforming upper mold is moved up by the main cylinder to an extent enough to move the carrier to the mold separating press device by the moving device.

At that time, only the heat upper mold is moved up by the main cylinder of the mold separating press device to thereby form a predetermined space between the heat upper mold and the heat middle mold. The carrier holding the preform is inserted into this space by the moving device. If the carrier is inserted to a predetermined position, the heat upper mold is moved down by the main cylinder of the mold separating press device, so that the preform held in the storage hole of the carrier is projected downward, and pushed so as to be transferred into the heat middle mold. The thus transferred preform is held in the heat middle mold by its own elasticity and frictional force.

If the preform is transferred into the heat middle mold, the heat upper mold is moved up to the position not to interfere with the carrier by the main cylinder of the mold separating press device, and the carrier is returned by the moving device. If the carrier is returned, the heat upper and middle molds are transferred onto the heat lower mold. Since this heat lower mold is mounted with a back metal in advance, the preform is put on the back metal. The combined heat molds including the back metal and the preform are moved to the heat press device for the sake of heat forming.

By repeating the respective processes having been described, preforms obtained by preforming a frictional material into a predetermined shape in the preforming press device are put on the carrier sequentially, and put into the heat middle mold of the heat mold automatically.

DESCRIPTION OF THE PREFERRED EMBODIMENTS

Figure 1:
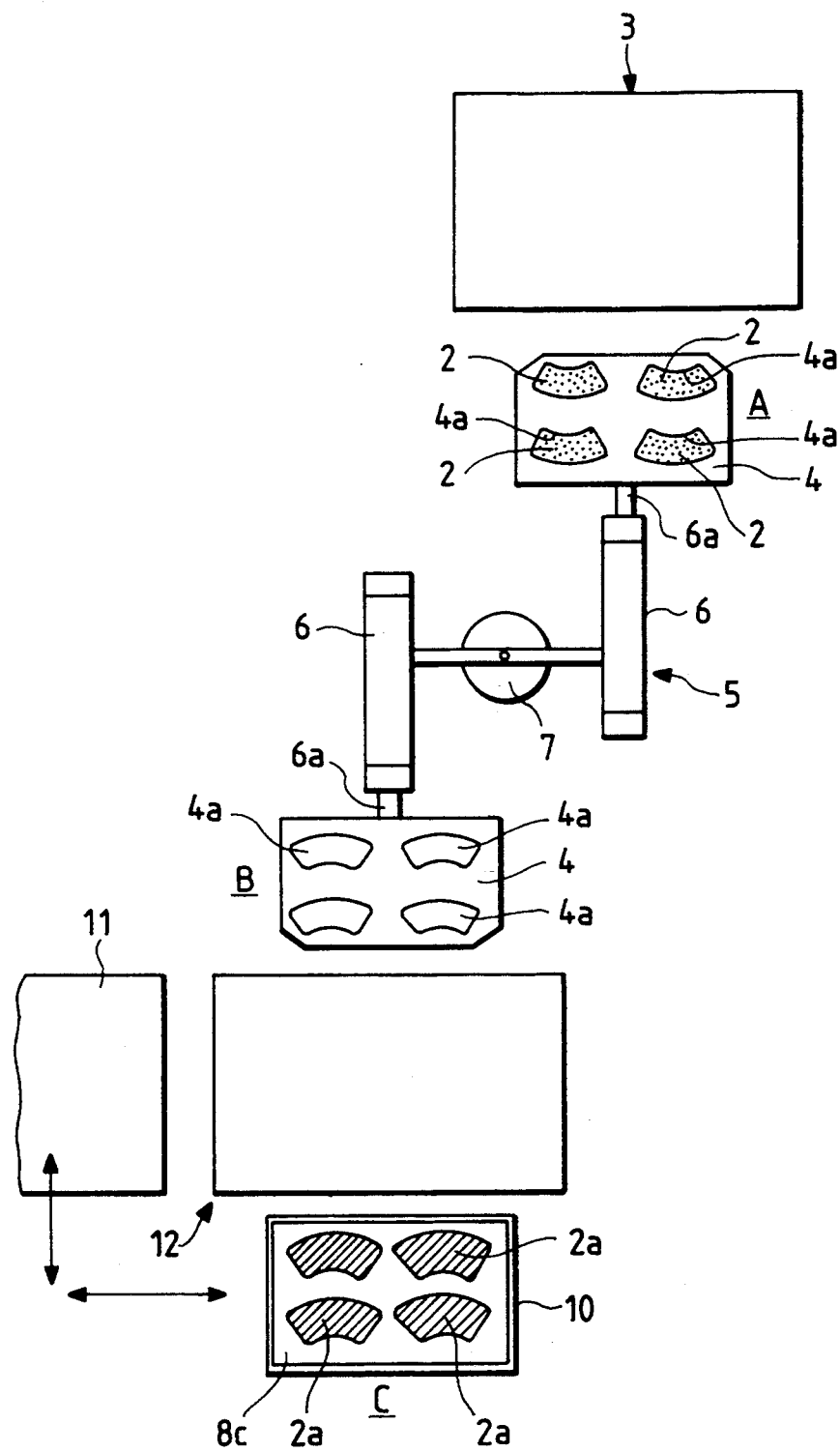
FIG. 1 is a plan view illustrating a moving device for carrying a preform of a frictional material according to an embodiment of the present invention.
Figure 2:
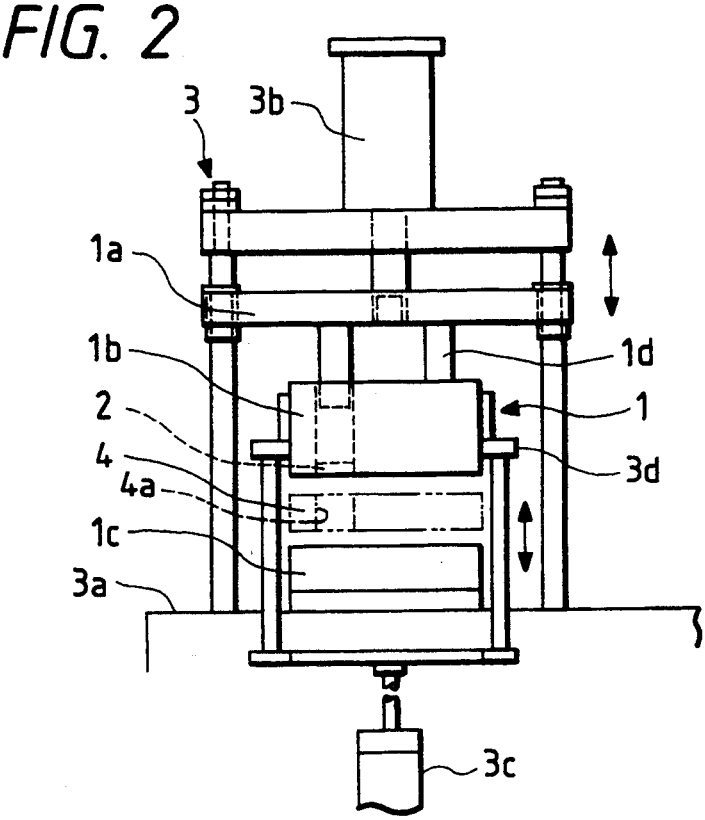
FIG. 2 is a front view illustrating a preforming press device in the same embodiment.

An embodiment of the present invention will be described with reference to the drawings. FIGS. 1 to 14 show an embodiment of the present invention. An apparatus for carrying preforms of frictional material has, as main constituents, a preforming press device 3, a mold separating press device 12, carriers 4 for holding preforms 2, and a moving device 5 for moving the carriers 4 in reciprocation between both the press devices 3 and 12 as shown in FIG. 1. The preforming press device 3 is provided with a preforming mold 1 as shown in FIG. 2. That is, the preforming press device 3 is provided with a preforming lower mold 1c put on a head 3a, punches 1d the same in number and shape as the mold surfaces of a preforming middle mold 1b, a preforming upper mold 1a up/down driven by a main cylinder 3b, and the preforming middle mold 1b disposed between the preforming upper mold 1a and the preforming lower mold 1c. The preforming middle mold 1b has a plurality (four in the drawings) of mold surfaces the same in shape as the preforms 2, and the preforming middle mold 1b is up/down driven through support frame members 3d by a middle mold elevating cylinder 3c as an up/down driving device provided under the head 3a.

A proper quantity of frictional material is put into the preforming middle mold 1b which is in tight contact with the preforming lower mold 1c. The frictional material is a mixture of a reinforcing basic material, a frictional performance adjusting agent, a bonding agent, and so on mixed uniformly by a not-shown stirrer in advance, and this is measured and thrown into a plurality of mold surfaces of the preforming middle mold 1b respectively. These preforms 2 are for disc brakes, and predetermined shapes are given to the respective mold surfaces of the preforming middle mold 1b. If the frictional material is put into the preforming middle mold 1b, the preforming upper mold 1a is moved down by the main cylinder 3b, and the frictional material is preformed into a predetermined shape in cooperation with the preforming lower mold 1c and the preforming middle mold 1b to obtain preforms 2.

Each carrier 4 has through storage holes 4a of enough size to hold the preforms 2 as shown in FIG. 1. The storage holes 4a of the carrier 4 are in the same positions and of almost the same shapes as the mold surfaces of the preforming middle mold 1b, and the preforms 2 preformed by the preforming press device 3 are transferred into the storage holes 4a of the carrier 4. The preforms 2 are held on the inner walls of the storage holes 4a of the carrier 4 by frictional force.

The moving device 5 is constituted by a pair of cylinder devices 6 which are linear driving device, and a rotation driving device 7, to which the carriers 4 are attached. That is, the carriers 4 are fixed to the tops of piston poles 6a of the respective cylinder devices 6 disposed contrariwise on the opposite sides of the rotation driving device 7 so as to be driven to go forward-/backward, and the cylinders of the respective cylinder devices 6 are attached to the rotation driving device 7 so as to be driven to rotate to an acceptance position A immediately before the preforms 2 are accepted into one carrier 4, and a take-out position B immediately before the preforms 2 are supplied from the other carrier 4 to the mold separating press device 12. Consequently, the moving device 5 has a function to move the respective carriers 4 in reciprocation between a position under the preforming middle mold 1b disposed in the preforming press device 3 and a position above the heat middle mold 8b disposed in the mold separating press device 12.

Figure 3:
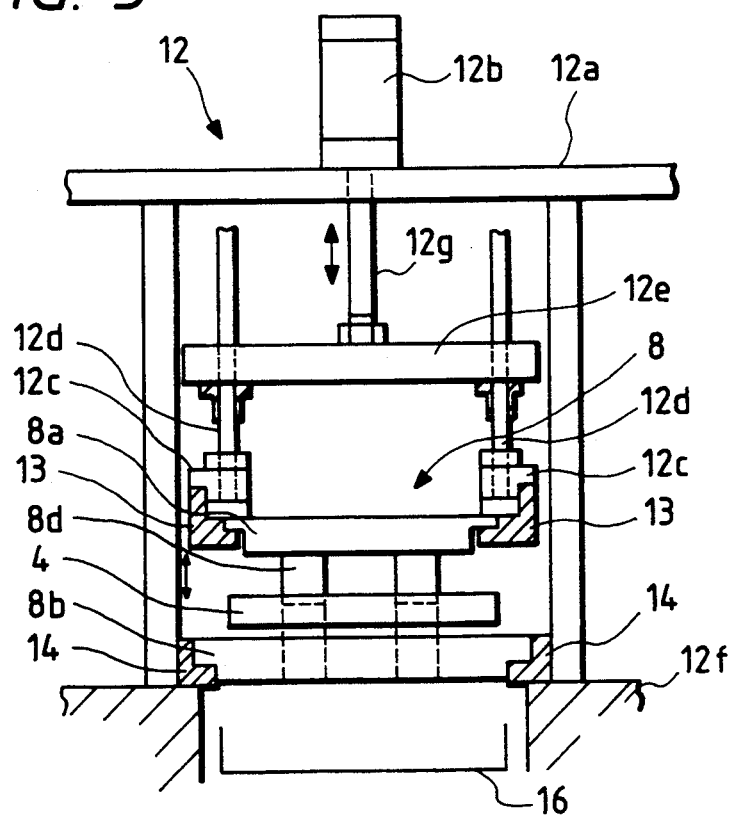
FIG. 3 is a front view showing a mold separating press device partially cur away in the same embodiment.

The mold separating press device 12 is disposed adjacently to the take-out position B, and has a function not only to thrust products 15 from the heat middle mold 8b but also to transfer the preforms 2 to the heat middle mold 8b from the carrier 4 holding the preforms 2. In the mold separating press device 12, a main cylinder 12b is fixed to the upper portion of a frame body 12a as shown in FIG. 3, a slider 12e fixed to the top of a piston pole 12g is up/down driven by the operation of the main cylinder 12b. Upper mold rails 13 are fixed to the opposite end portions of the slider 12e through support poles 12d and support members 12c respectively. In addition, middle mold rails 14 are fixed to the opposite ends of a bed 12f in parallel to the upper mold rails 13. These upper mold rails 13 guide the putting in/out of the heat upper mold 8a having a plurality of punches 8d having the same shapes as the preforms 2, and the middle mold rails 14 guide the putting in/out of the heat middle mold 8b for storing the preforms 2. Both the rails 13 and 14 are formed longer than the support members 12c. The up/down driving force by the main cylinder 12b acts on the heat upper mold 8a on the upper mold rails 13 through the support members 12c.

Figure 10:
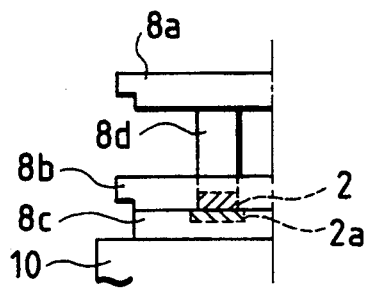
FIG. 10 is a diagram for explaining the operation of the heat mold in the same embodiment.

The heat mold 8 is constituted by the heat upper mold 8a, the heat middle mold 8b and the heat lower mold 8c, and put on a bogie 10 shown in FIG. 10 so as to move in reciprocation between a plurality of heat press devices 11 provided for one preforming press device 3, and a bogie stop position C. Of this heat mold, the heat upper and middle molds 8a and 8b are moved horizontally and inserted into the mold separating press device 12 after being moved up from the bogie 10, and the heat lower mold 8c is left as it is put on the bogie 10. A plurality of back metals 2a are disposed in the heat lower mold 8c in a state that they are buried in the heat lower mold 8c which is left as it is put on the bogie 10.

Figure 4:
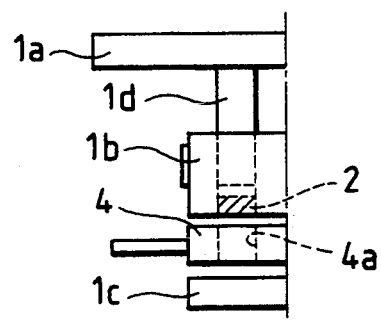
FIG. 4 is a diagram for explaining the operation of a preforming mold in the same embodiment.

Next, the operation of the above-mentioned embodiment will be described. In the preforming press device 3, a frictional material in the mold surface of the preforming middle mold 1b is preformed into a predetermined shape by the cooperation of the preforming upper mold 1a, the preforming middle mold 1b and the preforming lower mold 1c with each other to thereby obtain a preform 2. The preform 2 preformed in the preforming press device 3 is transferred to the carrier 4. That is, as shown in FIGS. 2 and 4, the preforming upper mold 1a is moved up by the main cylinder 3b, and the preforming middle mold 1b is moved up by the up/down driving device 3c through the support members 3d to thereby form a predetermined space above the preforming lower mold 1c. At that time, the preform 2 having elasticity is held in the preforming middle mold 1b by frictional force.

Figure 5:
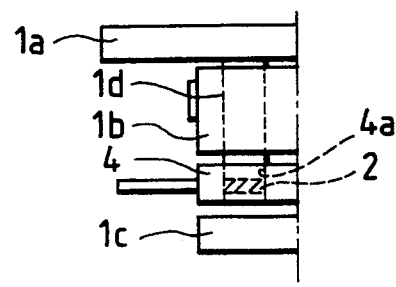
FIG. 5 is a diagram for explaining the operation of the preforming mold in the same embodiment.

Next, the cylinder device 6 attached to the carrier 4 in the acceptance position A is made to go forward, so that the carrier 4 fixed to the top of the piston pole 6a is inserted to this space. If the carrier 4 is inserted up to a predetermined position, the preforming upper mold 1a is moved down by the main cylinder 3b as shown in FIG. 5, so that the preform 2 held in the preforming middle mold 1b is pushed from above into the storage hole 4a of the carrier 4. The preform 2 preformed to be comparative soft is held in the intermediate portion of the storage hole 4a by frictional force, so that it cannot fall down.

If the preform 2 is held in the storage hole 4a of the carrier 4, the preforming upper mold 1a having the punches 1d is moved up by the main cylinder 3b to an extent enough to prevent interference between the punches 1d and the carrier 4. In this state, the cylinder device 6 is made to come back to thereby return the carrier 4 to the position (acceptance position A) where the carrier 4 does not interfere with the preforming press device 3 as shown in FIG. 1. Next, the rotation driving device 7 is driven to rotate this carrier 4 to the take-out position B. Since the other carrier 4 is moved to the acceptance position A by this rotation, this carrier 4 is made to hold the next preform 2 in the same procedure.

On the other hand, in the mold separating press device 12, the heat upper and middle molds 8a and 8b from which products 15 have been thrust as will be described later are disposed in advance. That is, the heat upper mold 8a is transferred onto the upper mold rails 13, the heat middle mold 8b is transferred onto the middle mold rails 14, and next both the molds 8a and 8b are moved to the center position of the support members 12c and inserted to the mold separating press device 12.

Figure 6:
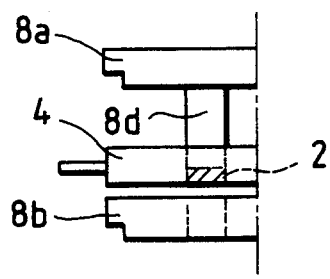
FIG. 6 is a diagram for explaining the operation of a heat mold in the same embodiment.
Figure 7:
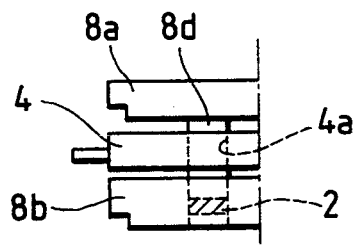
FIG. 7 is a diagram for explaining the operation of the heat mold in the same embodiment.
Figure 8:
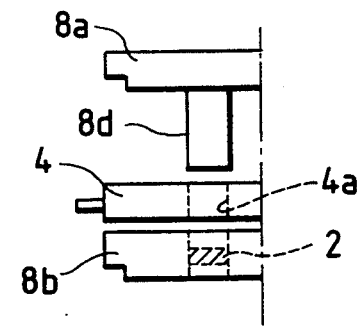
FIG. 8 is a diagram for explaining the operation of the heat mold in the same embodiment.

In this state, the carrier 4 holding the preform 2 is inserted into the mold separating press device 12. At that time, only the heat upper mold 8a is moved up by the main cylinder 12b to thereby form a predetermined space between the heat upper mold 8a and the heat middle mold 8b. The carrier 4 holding the preform 2 is inserted into this space. That is, the cylinder device 6 attached to the carrier 4 in the take-out position B is made to go forward, so that the carrier 4 fixed to the top of the piston pole 6a is inserted into this space. If the carrier 4 is inserted up to a predetermined position, the heat upper mold 8a is moved down by the main cylinder 12b as shown in FIG. 6, so that the preform 2 held in the storage hole 4a of the carrier 4 is pushed out by the punch 8d, and this preform 2 is pushed so as to be transferred into the heat middle mold 8b from the lower portion of the storage hole 4a of the carrier 4 as shown in FIG. 7.

Figure 9:
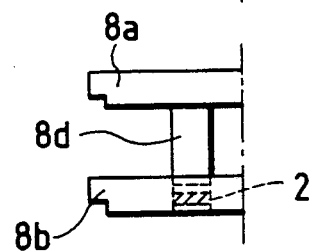
FIG. 9 is a diagram for explaining the operation of the heat mold in the same embodiment.

If the preform 2 is transferred into the heat middle mold 8b, the heat upper mold 8a is moved by the main cylinder 12b up to the position where it does not interfere with the carrier 4, and the cylinder device 6 is made to come back to thereby return the carrier 4 to the take-out position B. If the carrier 4 is returned, the heat upper mold 8a is moved down again as shown in FIG. 9, and the punch 8d is inserted a little into the heat middle mold 8b to be integrated with each other. In this state, the heat upper mold 8a is moved along the upper mold rails 13, and the heat middle mold 8b is moved along the middle mold rails 14. The preform 2 is held in the heat middle mold 8b by frictional force so that it cannot fall down. After that, the heat upper and middle molds 8a and 8b are transferred onto the heat lower mold 8c on the bogie 10 stopping in the bogie stop position C as shown in FIG. 10. Since this heat lower mold 8c is mounted with the back metal 2a in advance, the preform 2 is put on the back metal 2a. In such a manner, the combined heat mold 8 holding the back metal 2a and the preform 2 is mounted on the bogie 10 so as to be moved to one of the heat press devices 11 for the sake of heat forming.

Figure 11:
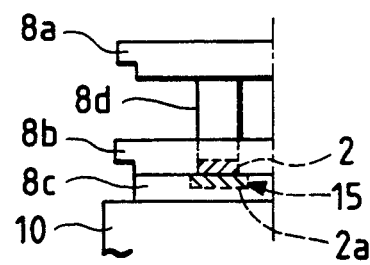
FIG. 11 is a diagram for explaining the operation of the heat mold in the same embodiment.
Figure 12:
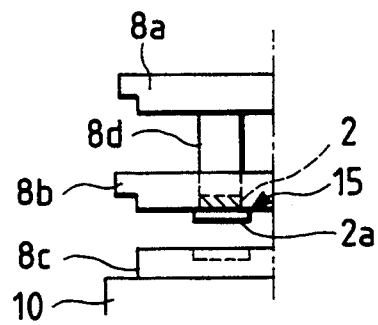
FIG. 12 is a diagram for explaining the operation of the heat mold in the same embodiment.
Figure 13:
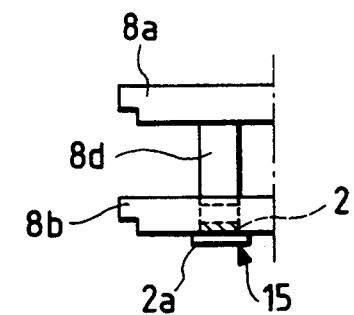
FIG. 13 is a diagram for explaining the operation of the heat mold in the same embodiment.
Figure 14:
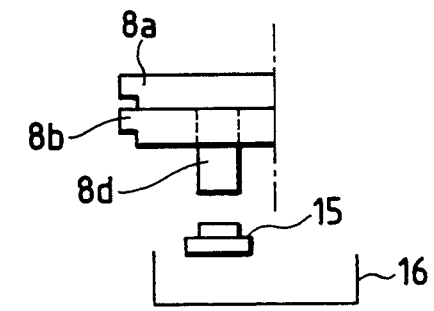
FIG. 14 is a diagram for explaining the operation of the heat mold in the same embodiment.

Next, the heat mold 8 taken out from the heat press device 11 will be described. This heat mold 8 is put on the bogie 10 while holding the product 15 which has been heated and preformed so that the back metal 2a is fixed to the preform 2 as shown in FIG. 11, and the heat mold 8 is moved to the bogie stop position C and stopped thereat. Only the heat upper and middle molds 8a and 8b are lifted from the bogie 10 while holding the product 15 as shown in FIG. 12, so that the heat upper mold 8a is transferred onto the upper mold rails 13, the heat middle mold 8b is transferred onto the middle mold rails 14, and both the molds 8a and 8b are moved to the center position of the support members 12c and then to the mold separating press device 12. Moved to the mold separating press device 12, only the heat upper mold 8a is moved up to separate the heat upper mold 8a from the preform 2 once as shown in FIG. 13, and next the heat upper mold 8a is moved down to thrust down the product 15 from the heat middle mold 8b as shown in FIG. 14. Since a product receiving box 16 is put under this heat middle mold 8b, the thrust product 15 is stored in the product receiving box 16. At that time, the heat lower mold 8c is left as it is put on the bogie 10, and a plurality of back metals 2a are disposed therein suitably.

By repeating the above respective processes, the preforms 2 obtained through preforming a frictional material into a predetermined shape in the preforming press device 3 are put on the carrier 4 sequentially, and set in the heat mold 8 automatically.

Although a pair of cylinder devices 6 constituting a moving device 5 are provided in the above embodiment, not to say, one cylinder device 6 may be driven to rotate by the rotation driving device 7.

As is understood from the above description, according to the method of carrying preforms of frictional material and the apparatus therefor according to the present invention, preforms obtained by preforming a frictional material into a predetermined shape are transferred onto a carrier sequentially, and set in a heat middle mold automatically, so that the working of transfer into the heat middle mold can be carried out efficiently, and the environment of working can be improved since it is not necessary that human hands touch the preforms directly. In addition, since preforms softer than conventional ones can be transferred into the heat middle mold automatically, the performance of forming in the next heat forming can be improved so that it is possible to obtain the effect to conspicuously improve the quality of a frictional material for a brake manufactured through heat forming.

What is claimed is:

1. A method of carrying a preform of a frictional material, in which after being preformed with a preforming mold having a preforming upper mold, a preforming middle mold and a preforming lower mold, a preform of a frictional material is carried so as to be put into a heat middle mold of a heat mold having a heat upper mold, said heat middle mold and a heat lower mold; wherein said preforming upper mold is moved down so that said preform held in said preforming middle mold is pushed from above into a through storage hole of a carrier, and after said carrier is carried to a portion above said heat middle mold, said heat upper mold is moved down so that said preform is pushed into said heat middle mold from the lower portion of said through storage hole of said carrier.

2. An apparatus for carrying a preform of a frictional material, comprising:
   a preforming mold having a preforming upper mold, a preforming middle mold and a preforming lower mold;
   a preforming press device being provided with said preforming mold and having a main cylinder for up/down driving said preforming upper mold and an up/down driving device for up/down driving said preforming middle mold, thereby preforming a frictional material to obtain a preform;
   a carrier having a through storage hole the size of which is large enough to hold said preform so that said preform held in said preforming middle mold is pushed from above into said through storage hole by means of said preforming upper mold;
   a mold separating press device being provided with a heat upper mold and a heat middle mold of a heat mold which has said heat upper mold, said heat middle mold and a heat lower mold, and having a main cylinder for up/down driving said heat upper mold; and
   a moving device for reciprocating said carrier between below said preforming middle mold and above said heat middle mold whereby said heat upper mold is moved down by said main cylinder of said mold separating press device to push said preform into said heat middle mold from the lower portion of said storage hole of said carrier.

* * * * *